United States Patent [19]
Taylor

[11] Patent Number: 5,461,788
[45] Date of Patent: Oct. 31, 1995

[54] GRASS TRIMMING DEVICE FOR POP-UP SPRINKLERS

[76] Inventor: Jack Taylor, 3207 W. Renee Dr., Phoenix, Ariz. 85027

[21] Appl. No.: 302,331

[22] Filed: Sep. 8, 1994

[51] Int. Cl.$^6$ ............................................. B26B 27/00
[52] U.S. Cl. ............................ 30/300; 30/310; 30/316; 30/DIG. 7; 172/25
[58] Field of Search ............................ 830/278, 300, 830/301, 310, 314, 315, 316, DIG. 7; 172/13, 15, 19, 21, 22, 25

[56] References Cited

U.S. PATENT DOCUMENTS

| | | | |
|---|---|---|---|
| 1,480,151 | 1/1924 | Cosman | 172/19 |
| 1,765,288 | 6/1930 | Schmidt | 172/25 |
| 1,857,383 | 5/1932 | Johnson | 172/25 |
| 2,082,476 | 6/1937 | Allen | 172/25 |
| 2,615,246 | 10/1952 | Littig | 172/19 |
| 2,670,537 | 3/1954 | Campbell | 30/310 |
| 2,691,823 | 10/1954 | Dombrowski | 30/310 |
| 2,764,926 | 10/1956 | Heimbigner | 30/316 |
| 2,809,864 | 10/1957 | Carr | 30/301 |
| 2,953,852 | 9/1960 | Dehn | 172/16 |
| 3,062,299 | 11/1962 | Koepfinger | 172/19 |
| 3,064,353 | 11/1962 | Montgomery | 30/310 |
| 3,111,995 | 11/1963 | Dahl | 172/18 |
| 3,127,939 | 4/1964 | Rink | 172/25 |
| 3,143,176 | 8/1964 | Drane, Jr. | 172/25 |
| 3,565,179 | 2/1971 | Paliani | 30/300 |
| 3,747,213 | 7/1973 | Green et al. | 30/300 |
| 3,814,189 | 6/1974 | Thompson | 172/13 |
| 3,905,103 | 9/1975 | Ford et al. | 172/13 |
| 3,938,249 | 2/1976 | Chacon | 30/300 |
| 3,960,218 | 6/1976 | Atchley et al. | 30/310 |
| 4,022,283 | 5/1977 | Morgan | 172/15 |
| 4,260,026 | 4/1981 | Deckert | 172/25 |
| 4,547,966 | 10/1985 | Eden | 30/300 |
| 4,832,131 | 5/1989 | Powell et al. | 172/25 |

Primary Examiner—Hwei Siu Payer
Attorney, Agent, or Firm—Frank J. McGue

[57] ABSTRACT

A device is disclosed for trimming grass from around a pop-up sprinkler having an annular top and a pop-up head concentrically mounted within the top. The device comprises a handle having a grip mounted on one end. A circular cutting element is mounted on the opposing end, the circular cutting element having a diameter larger than that of the annular top. A centering device mounted within the interior of the circular cutting element engages the pop-up head and centers the device over the top.

8 Claims, 1 Drawing Sheet

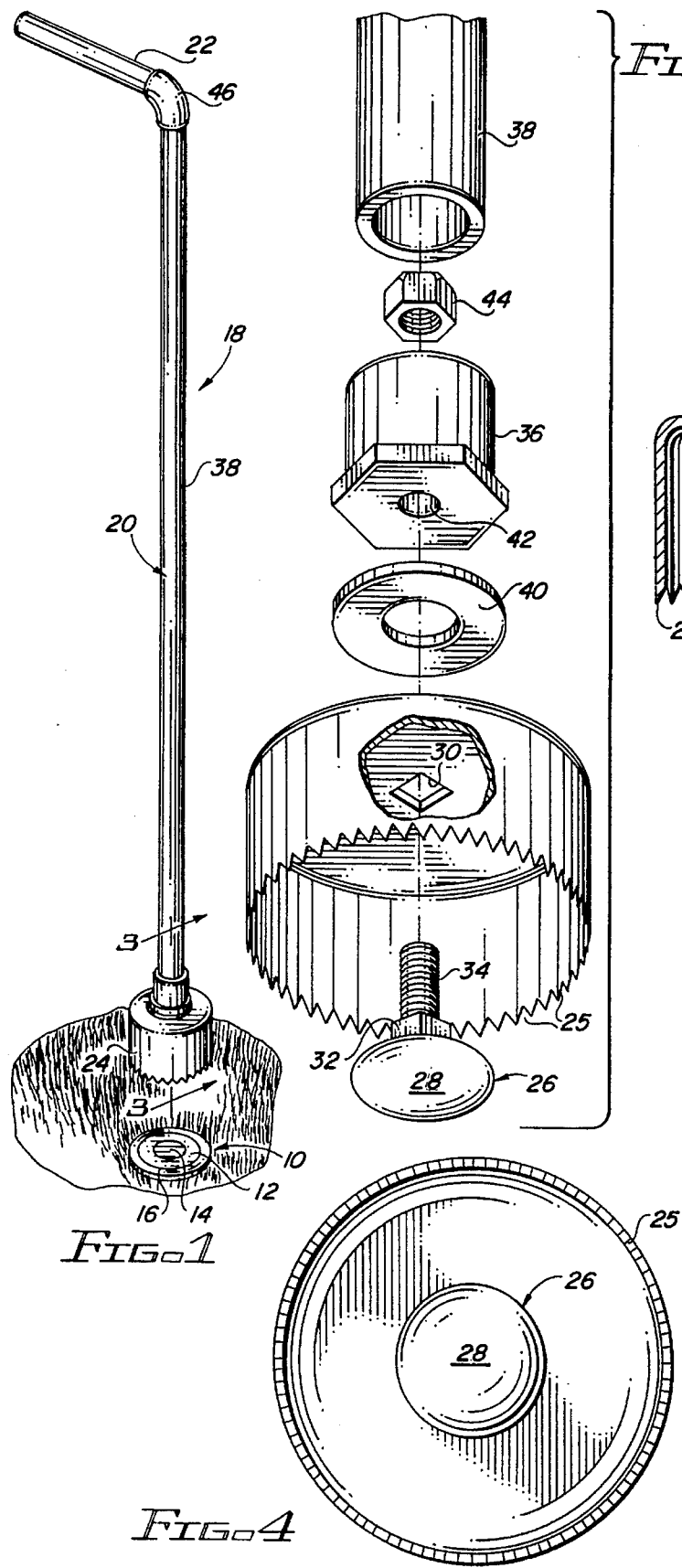

5,461,788

GRASS TRIMMING DEVICE FOR POP-UP SPRINKLERS

TECHNICAL FIELD

This invention relates to an improved device for trimming grass from around sprinklers and more particularly from around pop-up lawn sprinklers.

BACKGROUND OF THE INVENTION

Pop-up sprinklers are commonly used to provide water to lawns. The sprinklers are connected via risers to underground water piping. The sprinklers have cylindrical bodies which are embedded in the soil with an annular top even with the top of the soil. Mounted concentrically with the embedded body is a cylindrical element which, when activated by water pressure, pops up above the grass to provide a spray of water over an area of lawn. When the water is turned off, the element retracts such that the top of the pop-up element is recessed from the annular top of the cylindrical body. In general, a multiplicity of pop-up sprinklers are provided in any sprinkler system.

The grass comprising a lawn tends to grow more densely around the sprinkler heads because of the proximity to water. The dense growth periodically needs to be trimmed to guarantee even distribution of the spray.

DESCRIPTION OF THE PRIOR ART

Heretofore a number of patents have been directed to the trimming of lawn grasses from around sprinkler heads. For example, weed trimming devices utilizing a spinning plastic cord are often used for this purpose.

U.S. Pat. Nos. 1,857,383 and 3,062,299 disclose grass trimmers for sprinkler system nozzles. The apparatuses have movable, spring loaded centering members which engage the rim of a sprinkler head. The devices are centered, the handles pushed down to engage the cutting elements and then rotated. See also U.S. Pat. Nos. 3,905,103 and 4,832,131 for similar devices.

U.S. Pat. No. 1,480,151 discloses a grass cutter having an inner cylinder which fits the circumference of a nozzle. Both an outer cylinder and the inner cylinder have cutting edges and cooperate with blades to trim the grasses from around the head.

U.S. Pat. No. 2,615,246 provides a lawn trimmer having a head having blades attached thereto which is positioned around a sprinkler head so that upon turning the head via a handle member, the blades will remove a circular segment of turf.

U.S. Pat. No. 3,938,249 discloses a powered cutting tool which utilizes a blades attached to a U-shaped member to cut away grass from around a sprinkler. A shaft engages a nut mounted on the sprinkler head to center the device.

The known prior art is described above. None of the known prior art disclose the device set forth herein.

SUMMARY OF THE INVENTION

It is an object of this invention to provide a device which trims grass from around a pop-up lawn sprinkler.

It is a further object of this invention to provide a rugged, simple device for trimming the grass from around pop-up lawn sprinklers.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 1 is a perspective view of one embodiment of the present invention;

FIG. 2 is an exploded view of the lower portion of the invention;

FIG. 3 is a cross sectional view of FIG. 1 taken along the line 3—3;

FIG. 4 is a bottom view of present invention; and

FIG. 5 is a perspective view of an alternate embodiment of the handle of the present invention.

DESCRIPTION OF THE PREFERRED EMBODIMENT

Referring more particularly to the drawings by characters of reference, FIGS. 1–4 disclose a device for trimming grass from around pop-up lawn sprinklers. As best seen in FIG. 1, lawn pop-up sprinklers 10 have cylindrical bodies (not shown) which are embedded in the soil with an annular top 12 approximately even with the top of the soil. A flange 16 is often provided to maintain the sprinkler at the desired vertical position with respect to the soil. Mounted concentrically with the embedded body is a cylindrical element 14 which, when activated by water pressure, pops up above the grass to provide a spray of water over an area of lawn. When the water is turned off, the element retracts such that the top of the pop-up element 14 is recessed from the annular top 12 of the cylindrical body. Sprinklers having this configuration are presently sold under the names LAWN GENIE, ORBIT, RAINBIRD, TORO as well as other manufacturers.

The present invention is a trimmer 18 which includes a handle 20 having a grip 22 mounted on one end and a circular cutting element 24 mounted on the opposing end. The circular cutting element 24 is a cylinder having one open end and one closed end. The cylinder has an inner diameter greater than that of the sprinkler 10. Thus, the sprinkler 10 can be contained within the circular cutting element 24. Teeth 25 of the cutting element 24 extend circumferentially the open end of the circular cutting element 24 to engage and trim grasses from around the sprinkler 10.

As best seen in FIGS. 2 and 4, a centering device 26 which engages the recessed pop-up element 14 is mounted within the interior of the circular cutting element 24. To avoid damaging the element 14, the device 26 is smooth and convex.

Turning now to FIG. 2, in one embodiment, the centering device 26 is a head 28 of a stove bolt which is also used to mount the circular cutting element 24 to the handle 20. In this preferred embodiment, circular cutting element 24 is a 2½" diameter hole saw which includes a square hole 30 in its closed end which engages a square bolt 32 mounted between the head 28 and a screw 34 of the stove bolt. The combination of the square bolt 32 and the square hole 30 maintains the circular cutting element 24 in a fixed position with respect to the handle 20.

In this embodiment, handle 20, preferably PVC, includes an elongated tube 38 having a slip-on cap 36 mounted above the circular cutting element 24. A hole 42 is provided in the flat head of cap 36 whereby the screw 34 of the stove bolt extends therethrough. A washer 40 separates the cap 36 from the circular cutting element 24.

The screw 34 extends through square hole 30, washer 40 and hole 42 and engages a nut 44, preferably a self-locking nut such as a Nylo-nut. The described combination firmly joins the circular cutting element 24 to the cap 36. The cap 36 slips onto tube 38 and is permanently mounted thereto by an appropriate adhesive such as an epoxy cement.

Grip 22 extends at right angles from handle 20 as seen in FIG. 1. In one embodiment, a slip-on elbow 46 joins elongated tube 38 to grip 22 with the use of a suitable adhesive such as an epoxy cement.

An alternate embodiment of grip 22 is shown in FIG. 5. In this embodiment, a 45° angle 48 joins handle 22 to a bent grip tube 50. A 135° bend 52 in tube 50 separates an intermediate portion 54 from a gripping portion 56. A finger grip 58 can also be provided.

Alternative means of joining circular cutting element 24 to handle 20 and grip 22 to handle 20 will be readily apparent to those skilled in the art.

In use, a user will hold the device 18 by the grip 22 and place the circular cutting element 24 over a pop-up lawn sprinkler 10. The centering device 26 engages the retracted pop-up head 14 to center the circular cutting element 24 over the sprinkler body. A quarter turn in one direction cuts the grass surrounding the sprinkler 10 while a subsequent turn in the opposite direction acts to separate the cut grass for later pickup if desired.

Although but one embodiment has been illustrated and described, it will be apparent to those skilled in the art that various changes and modifications may be made therein without departing from the spirit of the invention or from the scope of the appended claims.

What is claimed is:

1. A device for trimming grass from around a pop-up sprinkler having an annular top and a pop-up head concentrically mounted within the top, the device comprising:

a handle having a grip mounted on one end and a circular cutting element mounted on the opposing end, the cutting element having a diameter larger than that of the top; and a smooth and convex stove bolt head engaging the pop-up head, the head being mounted within the interior of the cutting element.

2. The device of claim 1 wherein the stove bolt mounts the handle to the cutting element.

3. The device of claim 2 wherein the grip is curved.

4. A device for trimming grass from around a pop-up sprinkler having an annular top and a pop-up head concentrically mounted within the top, the pop-up head having a recessed position and a pop-up position, the device comprising:

a handle having a grip mounted on one end and a circular cutting element mounted on the opposing end, the cutting element having a diameter larger than that of the top; and a centering means engaging the pop-up head in the recessed position, the centering means being mounted within the interior of the cutting element, the centering means having a convex and smooth outer surface for engaging the pop-up head.

5. The device of claim 1 wherein the cutting element is a hole saw.

6. The device of claim 1 wherein the centering means being in the shape of a head of a stove bolt.

7. The device of claim 1 wherein the cutting element is a cylinder having an open end and a closed end, the open end having cutting teeth mounted circumferentially thereto, the closed end being mounted to the handle.

8. A device for trimming grass from around a pop-up sprinkler having an annular top and a pop-up head concentrically mounted within the top, the pop-up head having a recessed position and a pop-up position, the device comprising:

a handle having a grip mounted on one end and a circular cutting element mounted on the opposing end, the cutting element being a cylinder having an open end and a closed end, the open end having cutting teeth mounted circumferentially thereto, the closed end being mounted to the handle, the cutting element having a diameter larger than that of the top; and a centering means engaging the pop-up head in the recessed position, the centering means being mounted within the interior of the cutting element, the centering means having a convex and smooth outer surface for engaging the pop-up head.

\* \* \* \* \*